United States Patent [19]

Stokes et al.

[11] Patent Number: 5,005,054

[45] Date of Patent: Apr. 2, 1991

[54] FREQUENCY SWEEPING EXCITATION OF HIGH FREQUENCY VIBRATORY ENERGY PRODUCING DEVICES FOR ELECTROPHOTOGRAPHIC IMAGING

[75] Inventors: Ronald E. Stokes, Fairport; William J. Nowak, Webster; Anthony A. Attardi, Rochester; Daniel W. Costanza, Webster, all of N.Y.

[73] Assignee: Xerox Corporation, Stamford, Conn.

[21] Appl. No.: 548,645

[22] Filed: Jul. 2, 1990

[51] Int. Cl.⁵ .................... G03G 15/14; G03G 21/00; H02N 1/04

[52] U.S. Cl. .................................. 355/273; 310/325; 355/296

[58] Field of Search ...................... 355/271, 273, 296; 118/652; 15/1.51; 134/1; 310/325, 310

[56] References Cited

U.S. PATENT DOCUMENTS

| | | | |
|---|---|---|---|
| T893,001 | 12/1971 | Fisler . | |
| 3,113,225 | 12/1963 | Kleesattel et al. | 310/26 |
| 3,190,793 | 6/1965 | Starke | 162/278 |
| 3,370,186 | 2/1968 | Antonevich | 310/325 |
| 3,422,479 | 1/1969 | Jeffee | 15/100 |
| 3,483,034 | 12/1969 | Ensminger | 134/1 |
| 3,635,762 | 1/1972 | Ott et al. | 134/1 |
| 3,653,758 | 4/1972 | Trimmer et al. | 355/273 |
| 3,713,987 | 1/1973 | Low | 195/127 |
| 3,733,238 | 5/1973 | Long et al. | 156/580 |
| 3,854,974 | 12/1974 | Sato et al. | 117/17 |
| 4,007,982 | 2/1977 | Stange | 355/299 |
| 4,111,546 | 9/1978 | Maret | 355/297 |
| 4,121,947 | 10/1978 | Hemphill | 134/1 |
| 4,363,992 | 12/1982 | Holze, Jr. | 310/323 |
| 4,434,384 | 2/1984 | Dunnrowicz et al. | 310/325 |
| 4,483,571 | 11/1984 | Mishiro | 310/325 |
| 4,546,722 | 10/1985 | Toda et al. | 118/657 |
| 4,568,955 | 2/1986 | Hosoya et al. | 346/153.1 |
| 4,651,043 | 3/1987 | Harris et al. | 310/325 |
| 4,684,242 | 8/1987 | Schultz | 355/307 |
| 4,794,878 | 1/1989 | Connors et al. | 118/653 |
| 4,826,703 | 5/1989 | Kisler | 427/14.1 |
| 4,833,503 | 5/1989 | Snelling | 355/259 |

FOREIGN PATENT DOCUMENTS 62-195685 8/1987 Japan .

OTHER PUBLICATIONS

Xerox Disclosure Journal; "Floating Diaphragm Vacuum Shoe"; vol. 2; No. 6; Nov./Dec.; 1977; pp. 117–118.

*Primary Examiner*—A. T. Grimley
*Assistant Examiner*—Nestor R. Ramirez
*Attorney, Agent, or Firm*—Mark Costello

[57] ABSTRACT

For the enhancement of toner release from an imaging surface on a flexible belt member in an electrophotographic device a resonator suitable for generating vibratory energy is arranged in line contact with the back side of the belt member, to uniformly apply vibratory energy to the member. The resonator includes a horn divided into a linear array of segments, and an array of vibration producing elements, each coupled to at least one horn segment, and driven with a voltage to produce a high frequency vibratory response. To avoid the problem of variations in response that occurs due to varying resonant frequencies of each horn element, the vibration producing elements are driven across a range of frequencies that includes each resonant frequency required, over a relatively short period of time.

14 Claims, 11 Drawing Sheets

FREQUENCY SWEEPING EXCITATION OF HIGH FREQUENCY VIBRATORY ENERGY PRODUCING DEVICES FOR ELECTROPHOTOGRAPHIC IMAGING

This invention relates to reproduction apparatus, and more particularly, to an apparatus for uniformly applying high frequency vibratory energy to an imaging surface for electrophotographic applications.

CROSS REFERENCE

Cross reference is made to copending U.S. patent application Ser. No. 07/368,044, entitled "High Frequency Vibratory Enhanced Cleaning in an Electrostatic Imaging Device", assigned to the same assignee as the present invention; and to concurrently filed U.S. patent applications assigned to the present assignee and entitled: "Vacuum Coupling Arrangement for Applying Vibratory Motion to a Flexible Planar Member" by inventors C. Snelling et al. and assigned Ser. No. 07/54,835; "Segmented Resonator Structure Having a Uniform Response for Electrophotographic Imaging" by inventors W. Nowak et al. and assigned Attorney's Docket D/89387; "Method and Apparatus for Using Vibratory Energy to Reduce Transfer Deletions in Electrophotographic Imaging" by inventor C. Snelling and assigned Ser. No. 07/548,352; Edge Effect Compensation in High Frequency Vibratory Energy Producing Devices for Electrophotographic Imaging by inventors W. Nowak et al. and assigned Ser. No. 07/548,645; and "Method and Apparatus for Using Vibratory Energy With Application of Transfer Field for Enhanced Transfer in Electrophotographic Imaging" by inventors Pietrowski et al and assigned Ser. No. 07/548,351.

BACKGROUND OF THE INVENTION

In electrophotographic applications such as xerography, a charge retentive surface is electrostatically charged and exposed to a light pattern of an original image to be reproduced to selectively discharge the surface in accordance therewith. The resulting pattern of charged and discharged areas on that surface form an electrostatic charge pattern (an electrostatic latent image) conforming to the original image. The latent image is developed by contacting it with a finely divided electrostatically attractable powder or powder suspension referred to as "toner". Toner is held on the image areas by the electrostatic charge on the surface. Thus, a toner image is produced in conformity with a light image of the original being reproduced. The toner image may then be transferred to a substrate (e.g., paper), and the image affixed thereto to form a permanent record of the image to be reproduced. Subsequent to development, excess toner left on the charge retentive surface is cleaned from the surface. The process is well known and useful for light lens copying from an original and printing applications from electronically generated or stored originals, where a charged surface may be imagewise discharged in a variety of ways. Ion projection devices where a charge is imagewise deposited on a charge retentive substrate operates similarly. In a slightly different arrangement, toner may be transferred to an intermediate surface, prior to retransfer to a final substrate.

Transfer of toner from the charge retentive surface to the final substrate is commonly accomplished electrostatically. A developed toner image is held on the charge retentive surface with electrostatic and mechanical forces. A substrate (such as a copy sheet) is brought into intimate contact with the surface, sandwiching the toner thereinbetween. An electrostatic transfer charging device, such as a corotron, applies a charge to the back side of the sheet, to attract the toner image to the sheet.

Unfortunately, the interface between the sheet and the charge retentive surface is not always optimal. Particularly with non-flat sheets, such as sheets that have already passed through a fixing operation such as heat and/or pressure fusing, or perforated sheets, or sheets that are brought into imperfect contact with the charge retentive surface, the contact between the sheet and the charge retentive surface may be non-uniform, characterized by gaps where contact has failed. There is a tendency for toner not to transfer across these gaps. A copy quality defect referred to as transfer deletion results.

The problem of transfer deletion has been unsatisfactorily addressed by mechanical devices that force the sheet into the required intimate and complete contact with the charge retentive surface. Blade arrangements that sweep over the back side of the sheet have been proposed, but tend to collect toner if the blade is not cammed away from the charge retentive surface during the interdocument period, or frequently cleaned. Biased roll transfer devices have been proposed, where the electrostatic transfer charging device is a biased roll member that maintains contact with the sheet and charge retentive surface. Again, however, the roll must be cleaned. Both arrangements can add cost, and mechanical complexity.

That acoustic agitation or vibration of a surface can enhance toner release therefrom is known. U.S. Pat. No. 4,111,546 to Maret proposes enhancing cleaning by applying high frequency vibratory energy to an imaging surface with a vibratory member, coupled to an imaging surface at the cleaning station to obtain toner release. The vibratory member described is a horn arrangement excited with a piezoelectric transducer (piezoelectric element) at a frequency in the range of about 20 kilohertz. U.S. Pat. No. 4,684,242 to Schultz describes a cleaning apparatus that provides a magnetically permeable cleaning fluid held within a cleaning chamber, wherein an ultrasonic horn driven by piezoelectric transducer element is coupled to the backside of the imaging surface to vibrate the fluid within the chamber for enhanced cleaning. U.S. Pat. No. 4,007,982 to Stange provides a cleaning blade with an edge vibrated at a frequency to substantially reduce the frictional resistance between the blade edge and the imaging surface, preferably at ultrasonic frequencies. U.S. Pat. No. 4,121,947 to Hemphill provides an arrangement which vibrates a photoreceptor to dislodge toner particles by entraining the photoreceptor about a roller, while rotating the roller about an eccentric axis. Xerox Disclosure Journal "Floating Diaphragm Vacuum Shoe, by Hüll et al., Vol. 2, No. 6, Nov./Dec. 1977 shows a vacuum cleaning shoe wherein a diaphragm is oscillated in the ultrasonic range. U.S. Pat. No. 3,653,758 to Trimmer et al., suggests that transfer of toner from an imaging surface to a substrate in a non contacting transfer electrostatic printing device may be enhanced by applying vibratory energy to the backside of an imaging surface as the transfer station. This patent also suggests sweeping the transducer through a frequency range to seek a series of closely spaced resonant frequencies to try to excite a plate at two resonant frequencies. U.S. Pat. No. 4,546,722 to Toda et al., U.S. Pat. No. 4,794,878 to Connors et al. and U.S. Pat. No. 4,833,503 to Snelling disclose use of a piezoelectric transducer driving a resonator for the enhancement of development within a developer housing. Japanese Published Patent Appl. 62-195685 suggests that imagewise transfer of photoconductive toner, discharged in imagewise fashion, from a toner retaining surface to a substrate in a printing device may be enhanced by applying vibratory energy to the backside of the toner retaining surface. U.S. Pat. No. 3,854,974 to Sato et al. discloses vibration simultaneous with transfer across pressure engaged surfaces. However, this patent does not address the problem of deletions in association with corotron transfer.

Resonators for applying vibrational energy to some other member are known, for example in U.S. Pat. No. 4,363,992 to Holze, Jr. which shows a horn for a resonator, coupled with a piezoelectric transducer device supplying vibrational energy, and provided with slots partially through the horn for improving non uniform response long the tip of the horn. U.S. Pat. No. 3,113,225 to Kleesattel et al. describes an arrangement wherein an ultrasonic resonator is used for a variety of purposes, including aiding in coating paper, glossing or compacting paper and as friction free guides. U.S. Pat. No. 3,733,238 to Long et al. shows an ultrasonic welding device with a stepped horn. U.S. Pat. No. 3,713,987 to Low shows ultrasonic agitation of a surface, and subsequent vacuum removal of released matter.

Coupling of vibrational energy to a surface has been considered in Defensive Publication T893,001 by Fisler which shows an ultrasonic energy creating device is arranged in association with a cleaning arrangement in a xerographic device, and is coupled to the imaging surface via a bead of liquid through which the imaging surface is moved. U.S. Pat. No. 3,635,762 to Ott et al. and U.S. Pat. No. 3,422,479 to Jeffee show a similar arrangement where a web to photographic material is moved through a pool of solvent liquid in which an ultrasonic energy producing device is provided. U.S. Pat. No. 4,483,034 to Ensminger shows cleaning of a xerographic drum by submersion into a pool of liquid provided with an ultrasonic energy producing device. U.S. Pat. No. 3,190,793 Starke shows a method of cleaning paper making machine felts by directing ultrasonic energy through a cleaning liquid in which the felts are immersed.

In the ultrasonic welding horn art, as exemplified by U.S. Pat. No. 4,363,992 to Holze, Jr., where blade-type welding horns are used for applying high frequency energy to surfaces, it is known that the provision of slots through the horn perpendicular to the direction in which the welding horn extends, reduces undesirable mechanical coupling of effects across the contacting horn surface. Accordingly, in such art, the contacting portion of the horn is maintained as a continuous surface, the horn portion is segmented into a plurality of segments, and the horn platform, support and piezoelectric driver elements are maintained as continuous members. For uniformity purposes, it is desirable to segment the horn so that each segments acts individually. However, a unitary construction is also highly desirable, for fabrication and mounting purposes.

It has been noted that even with fully segmented hours, as shown in copending application assigned to the same assignee as the present application, and entitled, "Segmented Resonator Structure having a Uniform Response for Electrophotographic Imaging" by inventors W. Nowak et al. and assigned Ser. No. 07/548,517, there is a fall-off in response of the resonator at the outer edges of the device. A similar fall off is shown in U.S. Pat. No. 4,363,992 to Holze, Jr., at FIG. 2, showing the response of the resonator of FIG. 1.

Of interest is U.S. Pat. No. 4,826,703 to Kisler which suggests that in a coating apparatus controlled by variations in an electrode potential connected to a vibrator. U.S. Pat. No. 4,546,722 to Toda et al., U.S. Pat. No. 4,794,878 to Connors et al. and U.S. Pat. No. 4,833,503 to Snelling describe ultrasonic transducer-driven toner transport in a development system, in which a current source provides a wave pattern to move toner from a sump to a photoreceptor, U.S. Pat. No. 4,568,955 to Hosoya et al. teaches recording apparatus with a developing roller carrying developer to a recording electrode, and a signal source for propelling the developer from the developing roller to the recording media.

All the references cited herein are specifically incorporated by reference for their teachings.

SUMMARY OF THE INVENTION

In accordance with the invention there is provided a resonator for uniformly applying vibratory energy to a non-rigid image bearing member of an electrophotographic device to cause mechanical release of a toner from the charge retentive surface for subsequent enhanced electrostatic transfer, where the resonator includes a plurality of individually responsive elements each having a different resonant frequency, driven in accordance with a scheme to obtain maximum velocity at each element over a given period.

In accordance with one aspect of the invention, an electrophotographic device of the type contemplated by the present invention includes a non-rigid member having a charge retentive surface, driven along an endless path through a series of processing stations that create a latent image on the charge retentive surface, develop the image with toner, and bring a sheet of paper or other transfer member into intimate contact with the charge retentive surface at a transfer station for electrostatic transfer of toner from the charge retentive surface to the sheet. Subsequent to transfer, the charge retentive surface is cleaned of residual toner and debris. For the enhancement of toner release from a surface at any of the processing stations, a resonator suitable for generating vibratory energy is arranged in line contact with the back side of the non-rigid member, to uniformly apply vibratory energy to thereto. The resonator comprises a support member, a horn divided into a plurality of segments, the horn provided with a unitary platform portion, and having horn and contacting portions forming each horn segment, and a plurality of vibration producing elements to drives each segment of the horn at a resonant frequency to apply vibratory energy to the belt. The vibration producing elements are driven with a voltage signal having a range of frequencies selected to excite the horn segments to maximum tip velocity at some point during a frequency sweep over a given period of time.

In accordance with another aspect of the invention, to compensate for the differences in resonant frequencies across the resonator that result in responses varying from horn segment to horn segment, the vibration producing elements are driven over a range of frequencies including the expected resonant frequency for each horn segment, that will produce a desired response at the each horn segment.

U.S. patent application Ser. No. 07/368,044 entitled "High Frequency Vibratory Enhanced Cleaning in an Electrostatic Imaging Device", assigned to the same assignee as the present invention, and specifically incorporated herein by reference suggests pre-clean treatment enhancement by application of vibratory energy. The present invention finds use in this application as well.

These and other aspects of the invention will become apparent from the following description used to illustrate a preferred embodiment of the invention read in conjunction with the accompanying drawings in which.

Figure 9A:
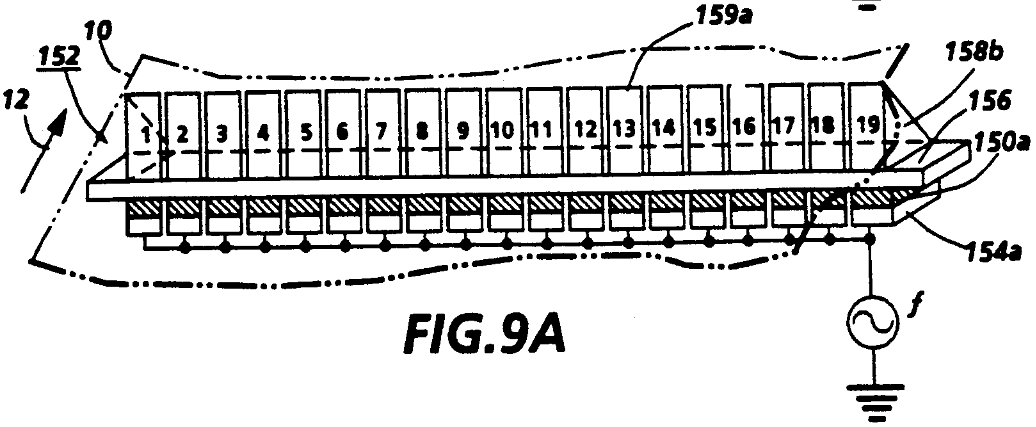
Figure 9B:
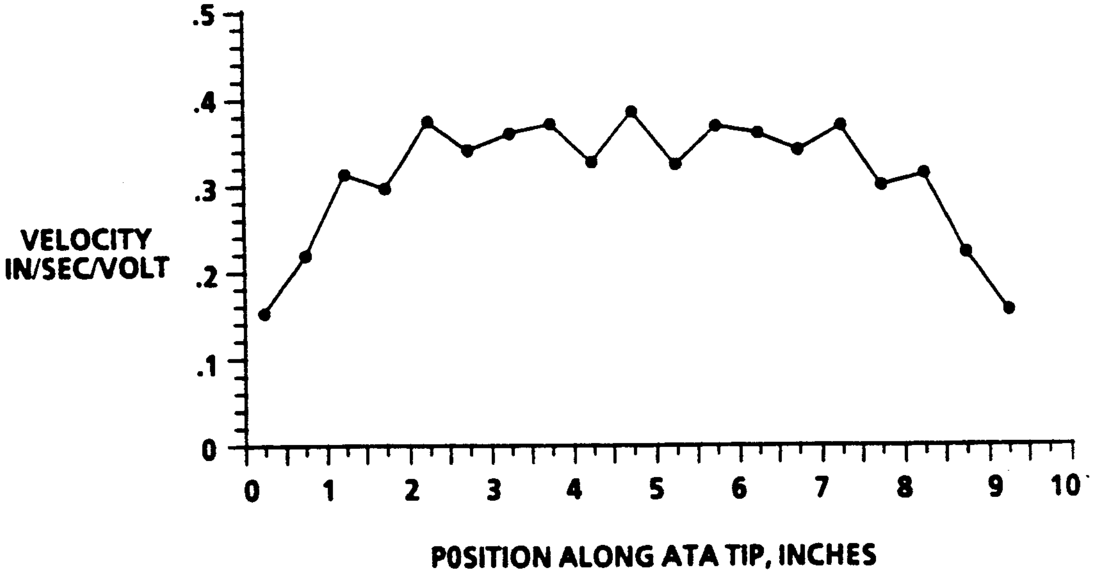
Figure 10A:
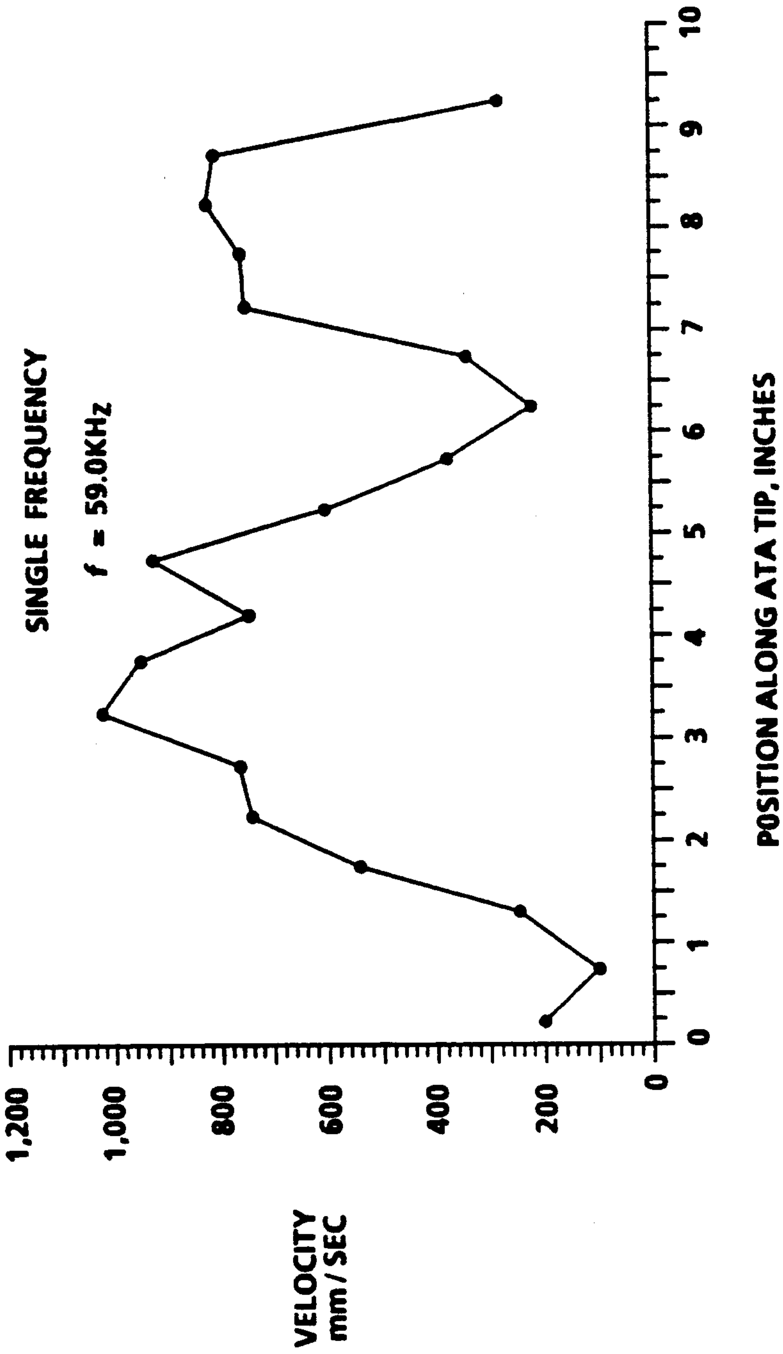
Figure 10B:
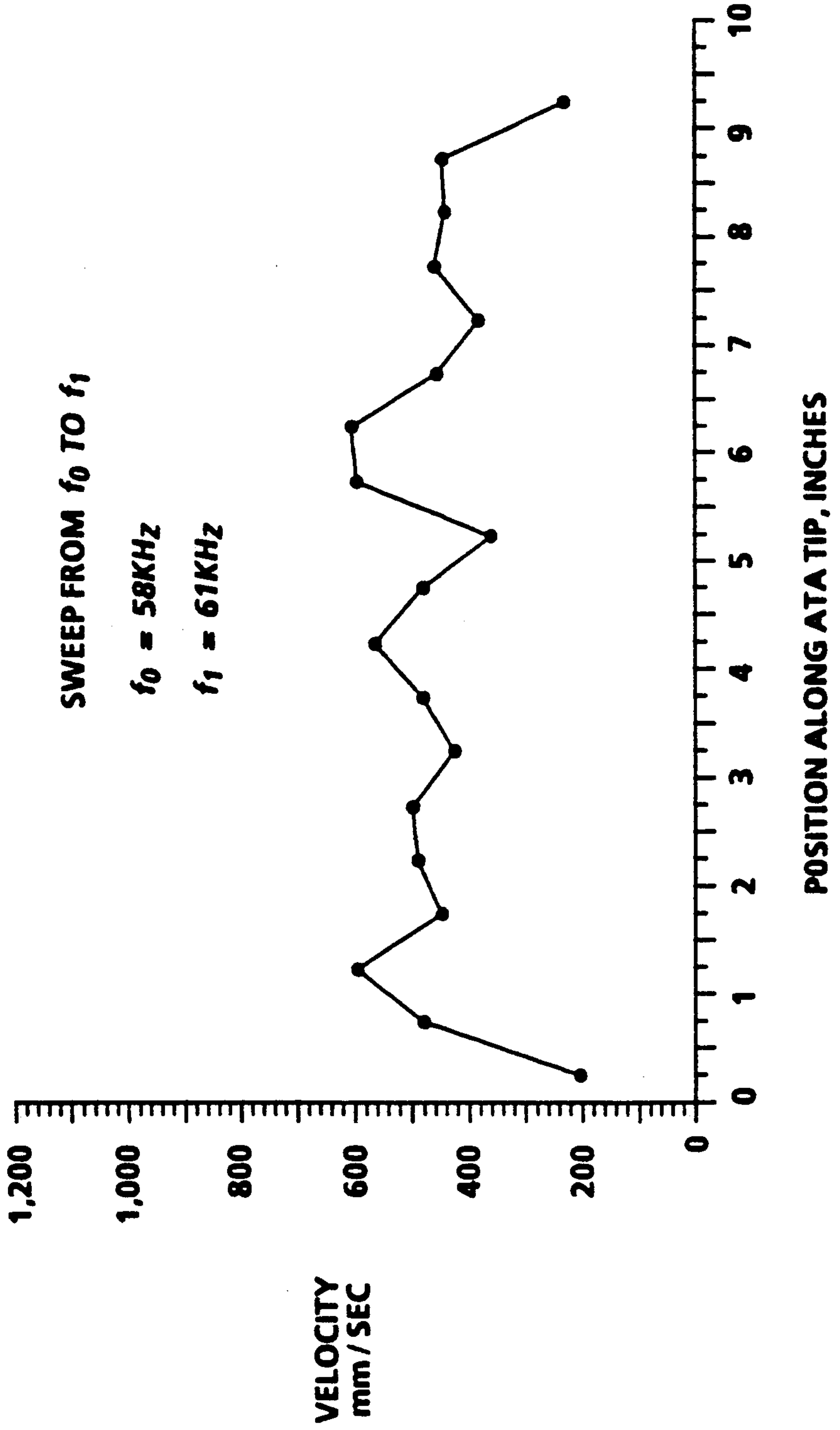
Figure 11A:
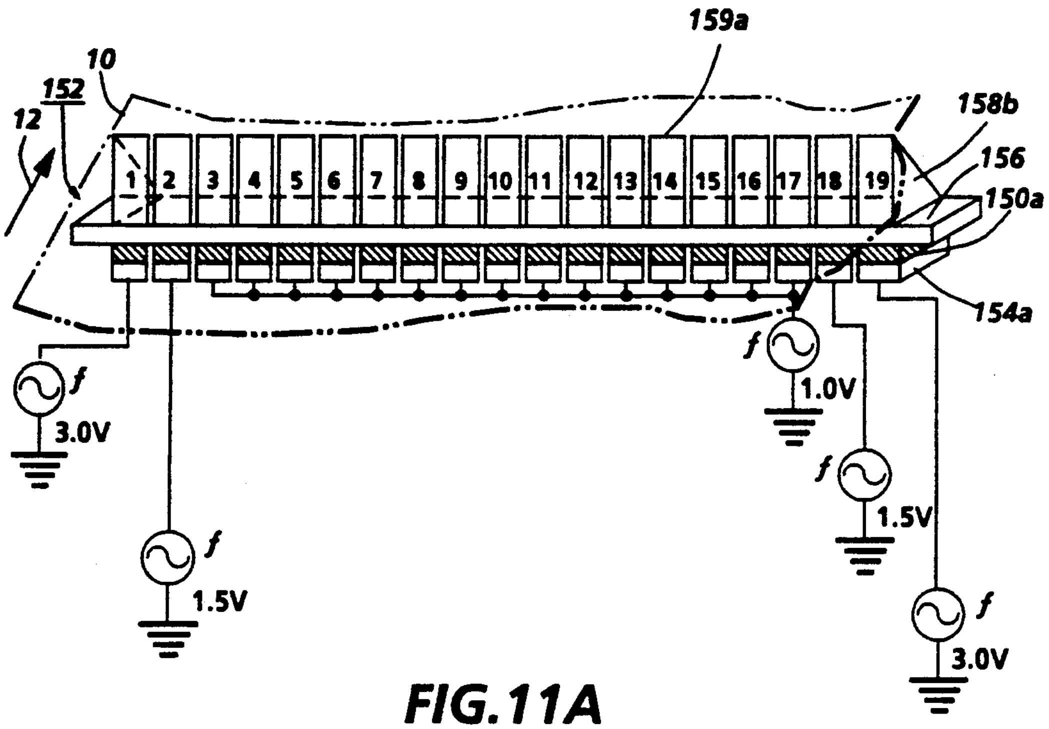
Figure 11B:
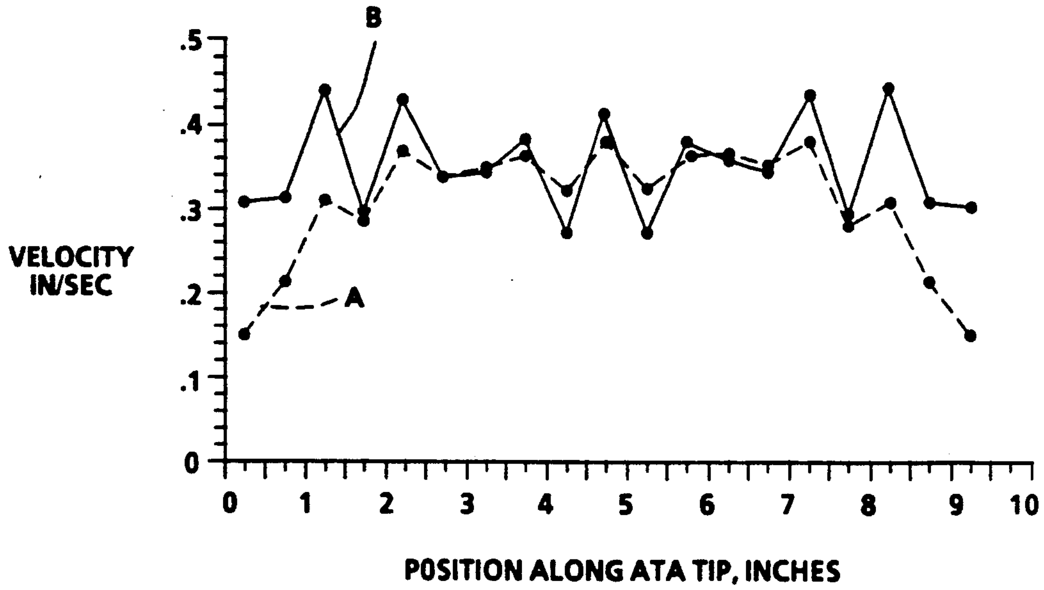

FIGS. 9A and 9B respectively show a view of another resonator and a response therefrom at a selected frequency;

FIGS. 10A and 10B respectively show resonator drive response derived therefrom when excited at a single frequency and when excited over a range of frequencies; and FIGS. 11A and 11B respectively show the resonator of FIG. 9 where segments are separately excited at voltages selected to produce an optimum response, and a comparison of responses when excited at a single voltage and multiple voltages.

Referring now to the drawings, where the showings are for the purpose of describing a preferred embodiment of the invention and not for limiting same, the various processing stations employed in the reproduction machine illustrated in FIG. 1 will be described only briefly. It will no doubt be appreciated that the various processing elements also find advantageous use in electrophotographic printing applications from an electronically stored original.

A reproduction machine in which the present invention finds advantageous use utilizes a photoreceptor belt 10. Belt 10 moves in the direction of arrow 12 to advance successive portions of the belt sequentially through the various processing stations disposed about the path of movement thereof.

Belt 10 is entrained about stripping roller 14, tension roller 16, idler rollers 18, and drive roller 20. Drive roller 20 is coupled to a motor (not shown) by suitable means such as a belt drive.

Belt 10 is maintained in tension by a pair of springs (not shown) resiliently urging tension roller 16 against belt 10 with the desired spring force. Both stripping roller 18 and tension roller 16 are rotatably mounted. These rollers are idlers which rotate freely as belt 10 moves in the direction of arrow 16.

Figure 1:
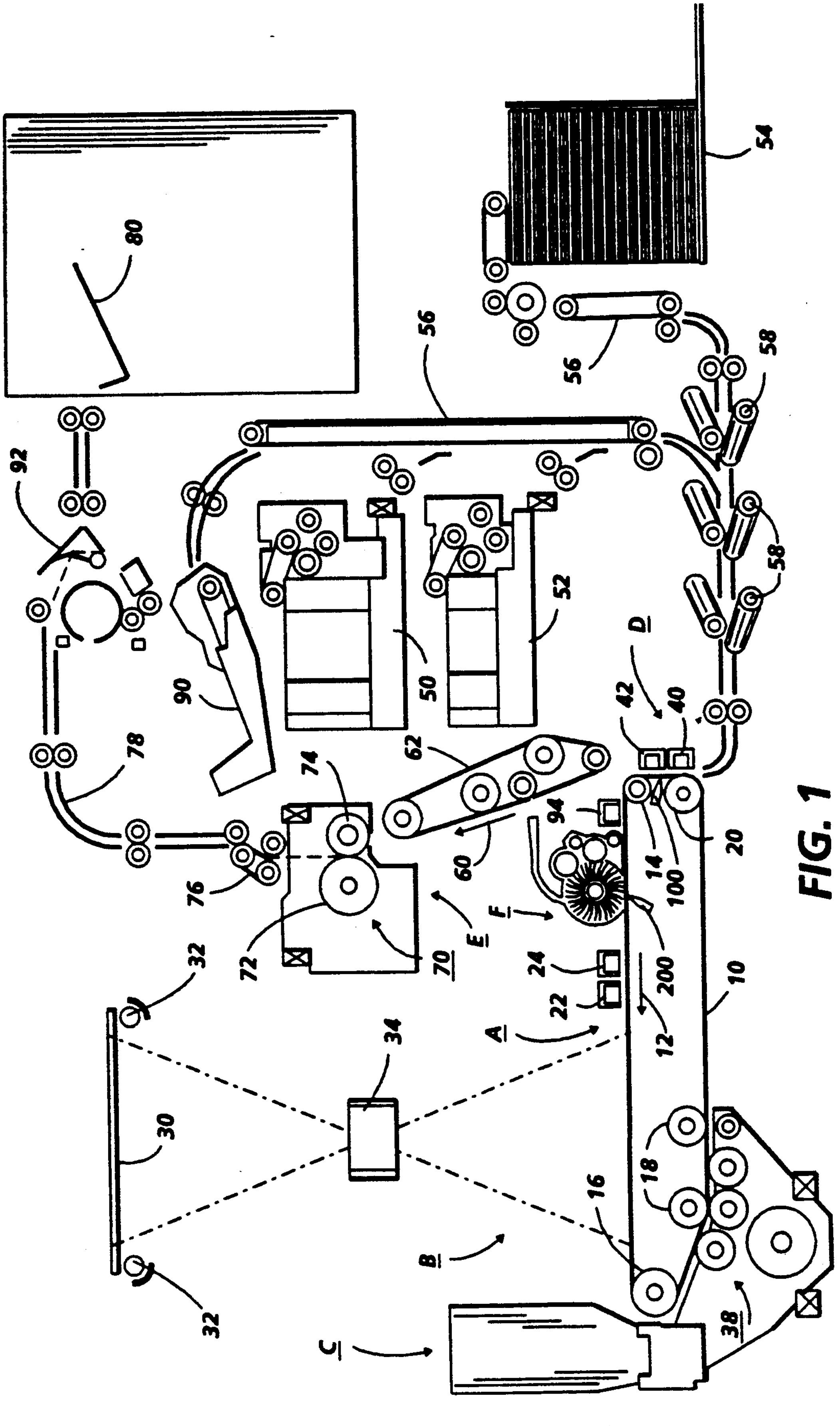
FIG. 1 is a schematic elevational view depicting an electrophotographic printing machine incorporating the present invention.

With continued reference to FIG. 1, initially a portion of belt 10 passes through charging station A. At charging station A, a pair of corona devices 22 and 24 charge photoreceptor belt 10 to a relatively high, substantially uniform negative potential.

At exposure station B, an original document is positioned face down on a transparent platen 30 for illumination with flash lamps 32. Light rays reflected from the original document are reflected through a lens 34 and projected onto a charged portion of photoreceptor belt 10 to selectively dissipate the charge thereon. This records an electrostatic latent image on the belt which corresponds to the informational area contained within the original document.

Thereafter, belt 10 advances the electrostatic latent image to development station C. At development station C, a developer unit 38 advances one or more colors or types of developer mix (i.e. toner and carrier granules) into contact with the electrostatic latent image. The latent image attracts the toner particles from the carrier granules thereby forming toner images on photoreceptor belt 10. As used herein, toner refers to finely divided dry ink, and toner suspensions in liquid.

Belt 10 then advances the developed latent image to transfer station D. At transfer station D, a sheet of support material such as a paper copy sheet is moved into contact with the developed latent images on belt 10. First, the latent image on belt 10 is exposed to a pretransfer light from a lamp (not shown) to reduce the attraction between photoreceptor belt 10 and the toner image thereon. Next, corona generating device 40 charges the copy sheet to the proper potential so that it is tacked to photoreceptor belt 10 and the toner image is attracted from photoreceptor belt 10 to the sheet. After transfer, a corona generator 42 charges the copy sheet with an opposite polarity to detack the copy sheet for belt 10, whereupon the sheet is stripped from belt 10 at stripping roller 14. The support material may also be an intermediate surface or member, which carries the toner image to a subsequent transfer station for transfer to a final substrate. These types of surfaces are also charge retentive in nature. Further, while belt type members are described herein, it will be recognized that other substantially non-rigid or compliant members may also be used with the invention.

Sheets of support material are advanced to transfer station D from supply trays 50, 52 and 54, which may hold different quantities, sizes and types of support materials. Sheets are advanced to tranfer station D along conveyor 56 and rollers 58. After transfer, the sheet continues to move in the direction of arrow 60 onto a conveyor 62 which advances the sheet to fusing station E.

Fusing station E includes a fuser assembly, indicated generally by the reference numeral 70, which permanently affixes the transferred toner images to the sheets. Preferably, fuser assembly 70 includes a heated fuser roller 72 adapted to be pressure engaged with a back-up roller 74 with the toner images contacting fuser roller 72. In this manner, the toner image is permanently affixed to the sheet.

After fusing, copy sheets bearing fused images are directed through decurler 76. Chute 78 guides the advancing sheet from decurler 76 to catch tray 80 or a finishing station for binding, stapling, collating etc. and removal from the machine by the operator. Alternatively, the sheet may be advanced to a duplex tray 90 from duplex gate 92 from which it will be returned to the processor and conveyor 56 for receiving second side copy.

A pre-clean corona generating device 94 is provided for exposing residual toner and contaminants (hereinafter, collectively referred to as toner) to corona to thereby narrow the charge distribution thereon for more effective removal at cleaning station F. It is contemplated that residual toner remaining on photoreceptor belt 10 after transfer will be reclaimed and returned to the developer station C by any of several well known reclaim arrangements, and in accordance with arrangement described below, although selection of a non-reclaim option is possible.

As thus described, a reproduction machine in accordance with the present invention may be any of several well known devices. Variations may be expected in specific processing, paper handling and control arrangements without affecting the present invention.

Figure 2:
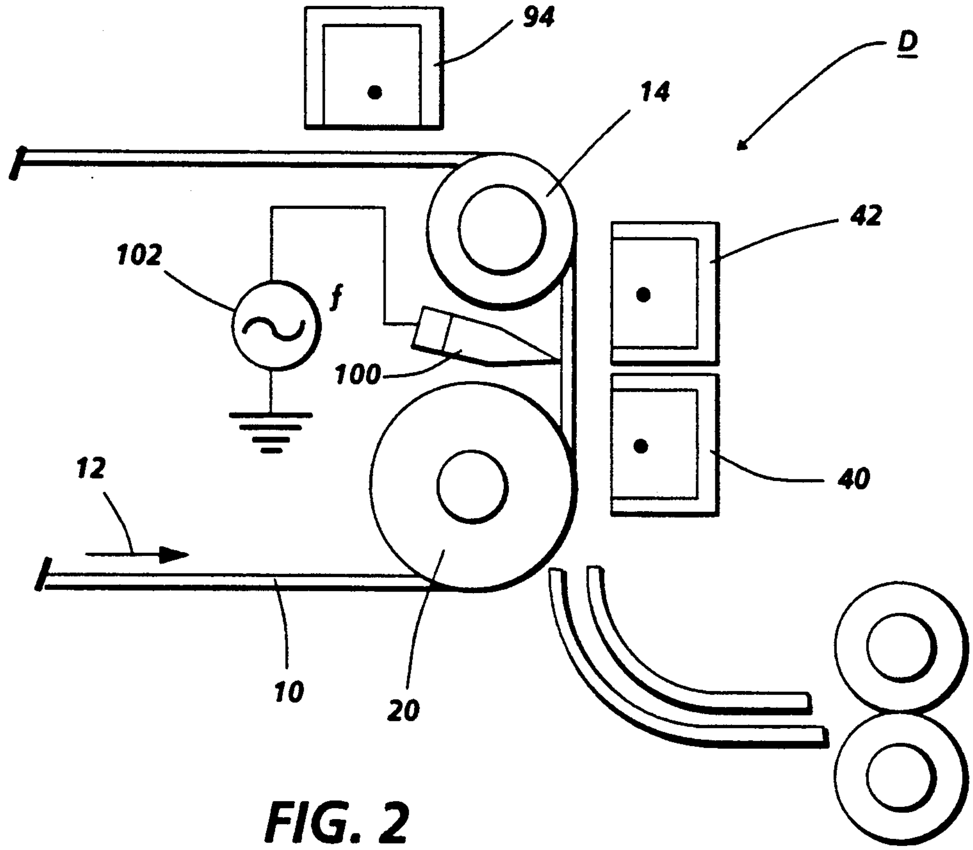
FIG. 2 is a schematic illustration of the transfer station and the associated ultrasonic transfer enhancement device of the invention.

With reference to FIG. 2, the basic principle of enhanced toner release is illustrated, where a relatively high frequency acoustic or ultrasonic resonator 100 driven by an A.C. source 102 operated at a frequency f between 20 kHz and 200 kHz, is arranged in vibrating relationship with the interior or back side of belt 10, at a position closely adjacent to where the belt passes through transfer station D. Vibration of belt 10 agitates toner developed in imagewise configuration onto belt 10 for mechanical release thereof form belt 10, allowing the toner to be electrostatically attracted to a sheet during the transfer step, despite gaps caused by imperfect paper contact with belt 10. Additionally, increased transfer efficiency with lower transfer fields than normally used appears possible with the arrangement. Lower transfer fields are desirable because the occurrence of air breakdown (another cause of image quality defects) is reduced. Increased toner transfer efficiency is also expected in areas where contact between the sheet and belt 10 is optimal, resulting in improved toner use efficiency, and a lower load on the cleaning system F. In a preferred arrangement, the resonator 100 is arranged with a vibrating surface parallel to belt 10 and transverse to the direction of belt movement 12, generally with a length approximately co-extensive with the belt width. The belt described herein has the characteristic of being non-rigid, or somewhat flexible, to the extent that it can be made to follow the resonator vibrating motion.

Figure 3A:
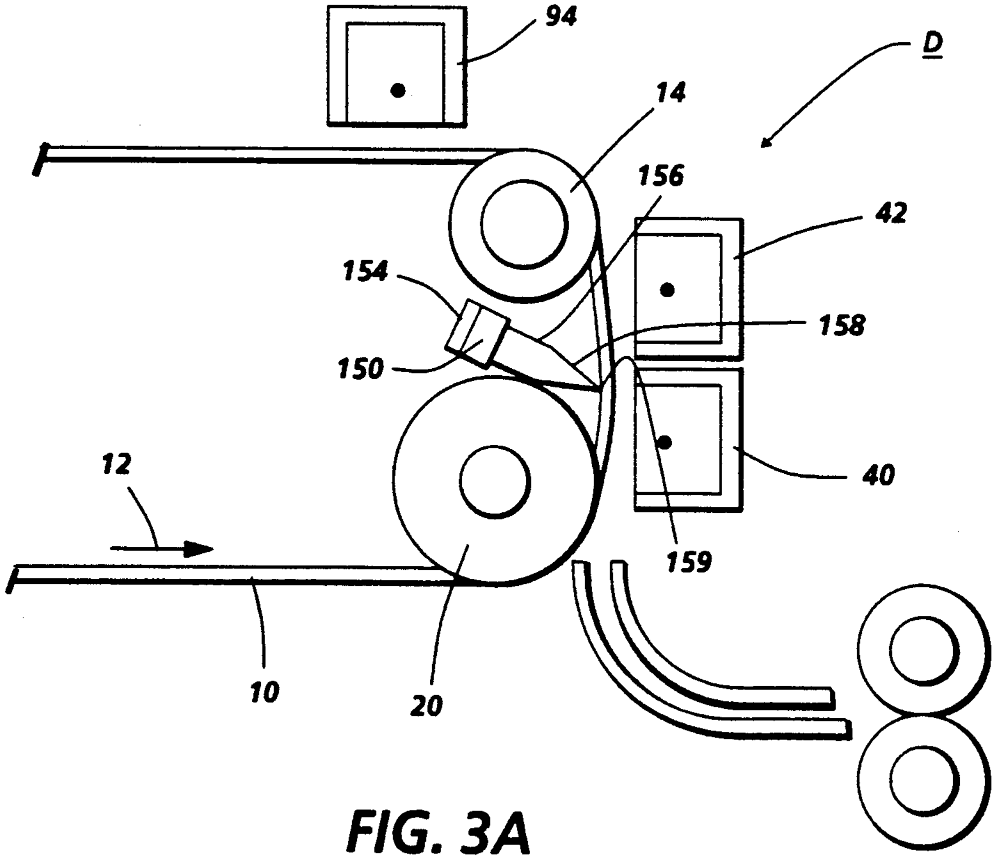
FIGS. 3A and 3B illustrate schematically two arrangements to couple an ultrasonic resonator to an imaging surface.
Figure 3B:
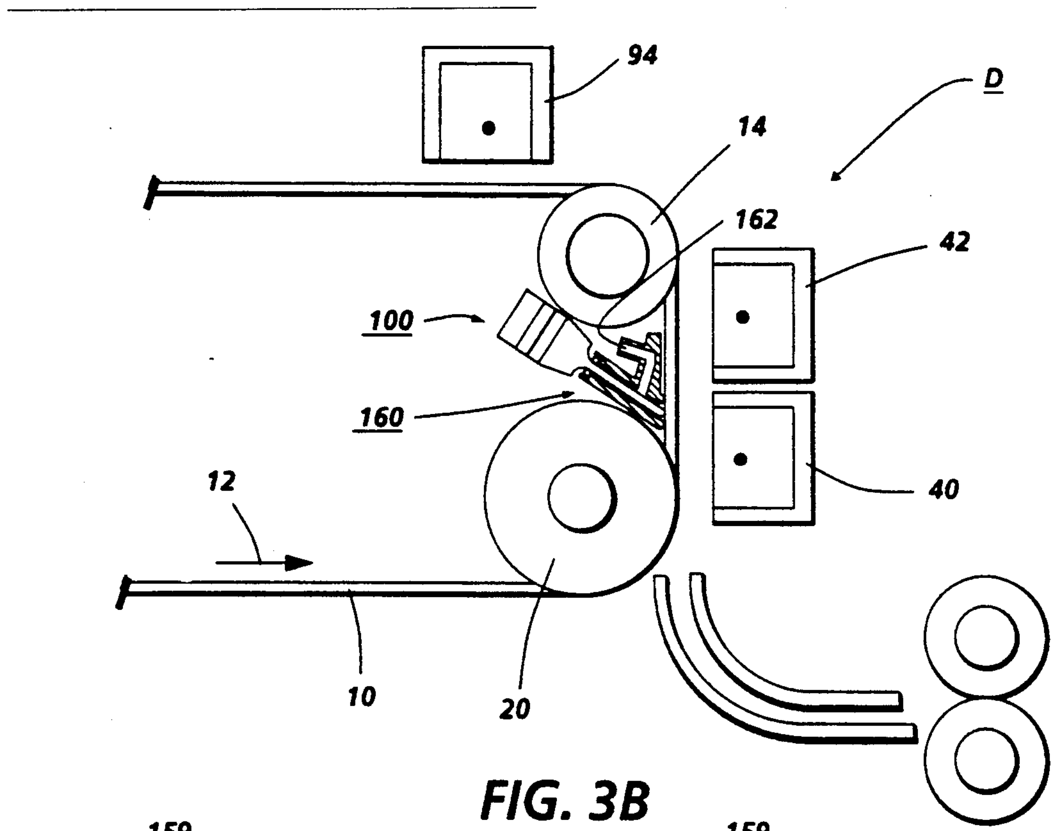

With reference to FIGS. 3A and 3B, the vibratory energy of the resonator 100 may be coupled to belt 10 in a number of ways. In the arrangement of FIG. 3A, resonator 100 may comprise a piezoelectric transducer element 150 and horn 152, together supported on a backplate 154. Horn 152 includes a platform portion 156 and a horn tip 158 and a contacting tip 159 in contact with belt 10 to impart the acoustic energy of the resonator thereto. To hold the arrangement together, fasteners (not shown) extending through backplate 154, piezoelectric transducer element 150 and horn 152 may be provided. Alternatively, an adhesive expoxy and conductive mesh layer may be used to bond the horn and piezoelectric transducer element together, without the requirement of a backing plate or bolts. Removing the backplate reduces the tolerances required in construction of the resonator, particularly allowing greater tolerance in the thickness of the piezoelectric element.

The contacting tip 159 of horn 152 may be brought into a tension or penetration contact with belt 10, so that movement of the tip carries belt 10 in vibrating motion. Penetration can be measured by the distance that the horn tip protrudes beyond the normal position of the belt, and may be in the range of 1.5 to 3.0 mm. It should be noted that increased penetration produces a ramp angle at the point of penetration. For particularly stiff sheets, such an angle may tend to cause lift at the trail edges thereof.

As shown in FIG. 3B, to provide a coupling arrangement for transmitting vibratory energy from a resonator 100 to photoreceptor 10, the resonator may be arranged in association with a vacuum box arrangement 160 and, and vacuum supply 162 (vacuum source not shown) to provide engagement of resonator 100 to photoreceptor 10 without penetrating the normal plane of the photoreceptor.

Figure 4A:
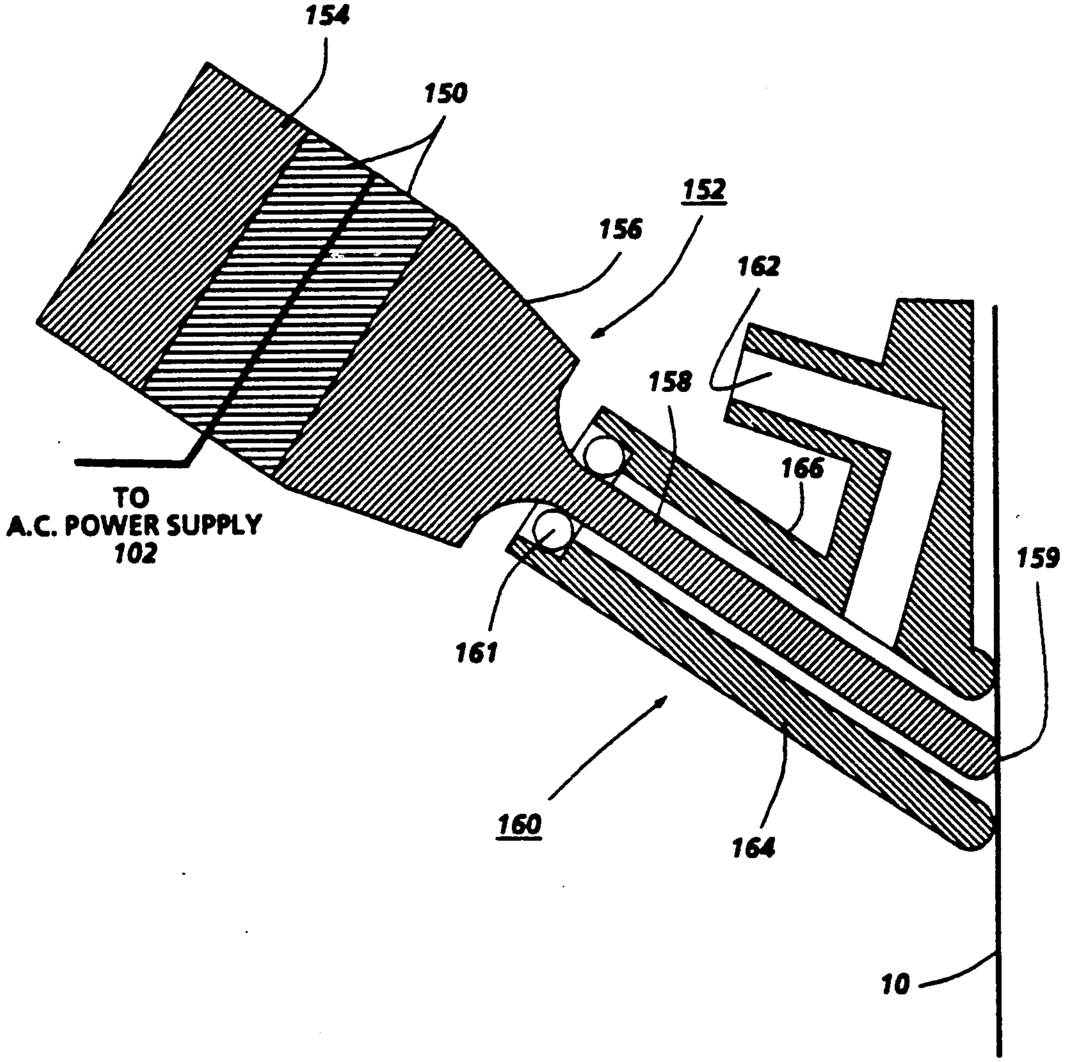
FIGS. 4A and 4B are cross sectional views of vacuum coupling assemblies in accordance with the invention.

With reference to FIG. 4A, resonator 100 may comprise a piezoelectric transducer element 150 and horn 152, together supported on a backplate 154. Horn 152 includes a platform portion 156, horn tip 158 and contacting tip 159 in contact with belt 10 to impart acoustic energy of the resonator thereto. An adhesive may be used to bond the assembly elements together.

FIG. 4A shows an assembly arranged for coupling contact with the backside of a photoreceptor in the machine shown in FIG. 1, which presents considerable spacing concerns. Accordingly, horn tip 158 extends through a generally air tight vacuum box 160, which is coupled to a vacuum source such as a diaphragm pump or blower (not shown) via outlet 162 formed in one or more locations along the length of upstream or downstream walls 164 and 166, respectively, of vacuum box 160. Walls 164 and 166 are approximately parallel to horn tip 156, extending to approximately a common plane with the contacting tip 159, and forming together an opening in vacuum box 160 adjacent to the photoreceptor belt 10, at which the contacting tip contacts the photoreceptor. The vacuum box is sealed at either end (inboard and outboard sides of the machine) thereof (not shown). The entry of horn tip 158 into vacuum box 160 is sealed with an elastomer sealing member 161, which also serves to isolate the vibration of horn tip 158 from wall 164 and 166 of vacuum box 160. When vacuum is applied to vacuum box 160, via outlet 162, belt 10 is drawn in to contact with walls 164 and 166 and horn tip 158, so that horn tip 158 imparts the acoustic energy of the resonator to belt 10. interestingly, walls 164 or 166 of vacuum box 160 also tend to damp vibration of the belt outside the area in which vibration is desired, so that the vibration does not disturb the dynamics of the sheet tacking or detacking process, or the integrity of the developed image.

Figure 4B:
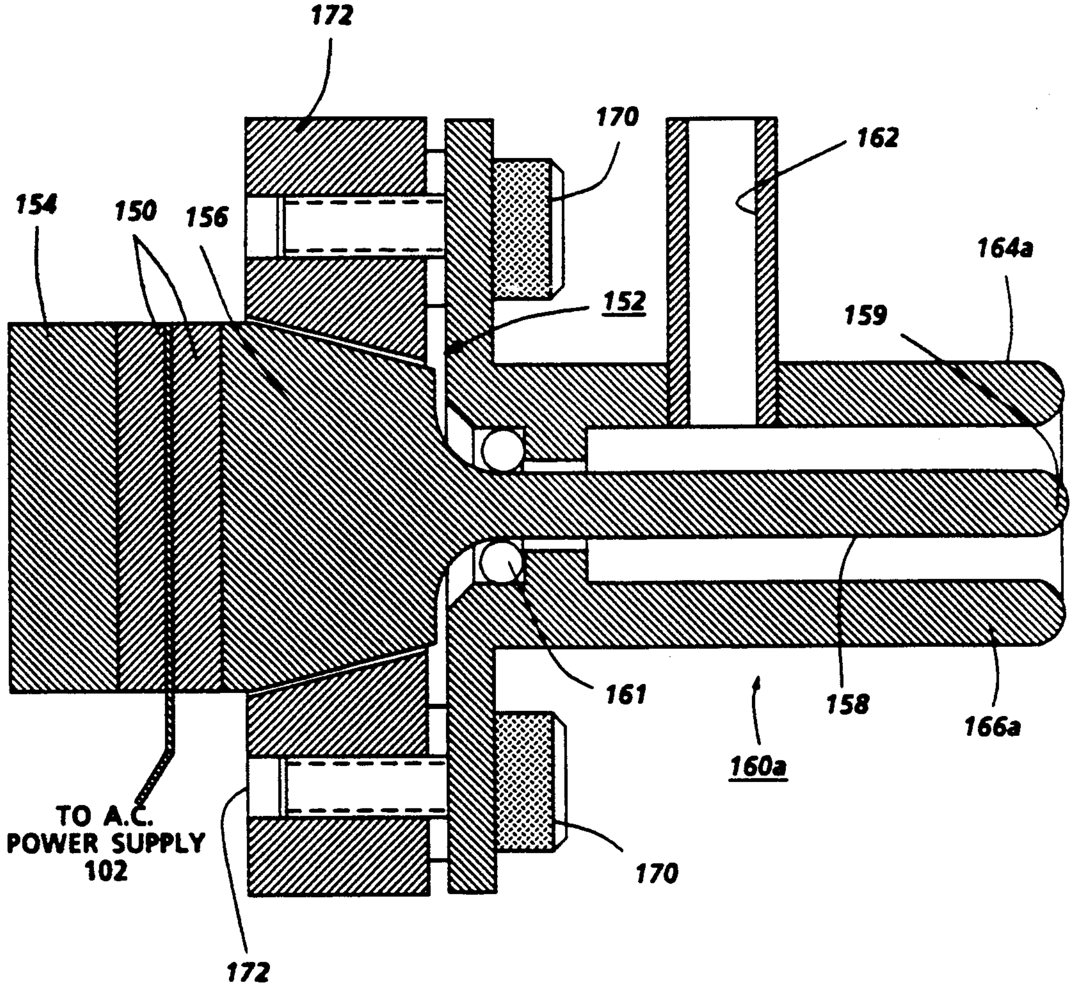

FIG. 4B shows a similar embodiment for coupling the resonator to the backside of photoreceptor 10, but arranged so that the box walls **164*a* and 166*b* and horn tip 158 may be arranged substantially perpendicular to the surface of photoreceptor 10. Additionally, a set of fasteners 170 is used in association with a bracket 172 mounted to the resonator 100 connect the vacuum box 160*a* to resonator 100**.

Application of high frequency acoustic or ultrasonic energy to belt 10 occurs within the area of application of transfer field, and preferably within the area under transfer corotron 40. While transfer efficiency improvement appears to be obtained with the application of high frequency acoustic or ultrasonic energy throughout the transfer field, in determining an optimum location for the positioning of resonator 100, it has been noted that transfer efficiency improvement is at least partially a function of the velocity of the horn tip 158. As tip velocity increases, it appears that a desirable position of the resonator is approximately opposite the centerline of the transfer corotron. For this location, optimum transfer efficiency was achieved for tip velocities in the range of 300–500 mm/sec. At very low tip velocity, from 0 mm/second to 45 mm/sec, the positioning of the transducer has relatively little effect on transfer characteristics. Restriction of application of vibrational energy, so that the vibration does not occur outside the transfer field is preferred. Application of vibrational energy outside the transfer field tends to cause greater electromechanical adherence of toner to the surface of problem for subsequent transfer or cleaning.

Figure 5A:
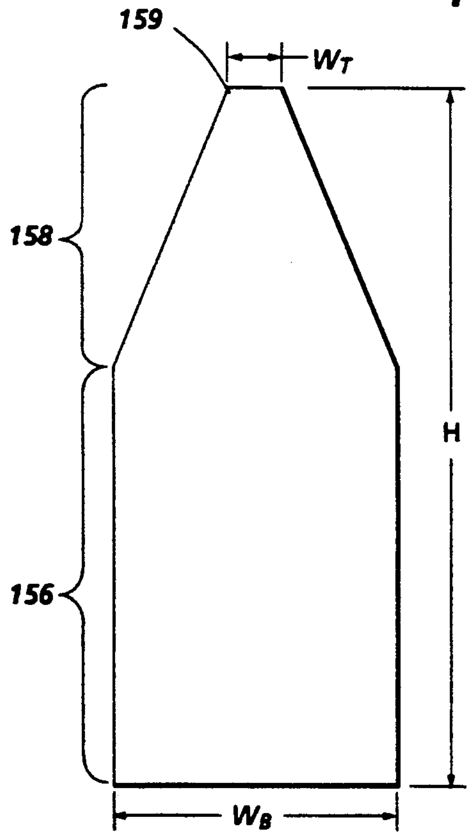
FIGS. 5A and 5B are cross sectional views of two types of horns suitable for use with the invention.
Figure 5B:
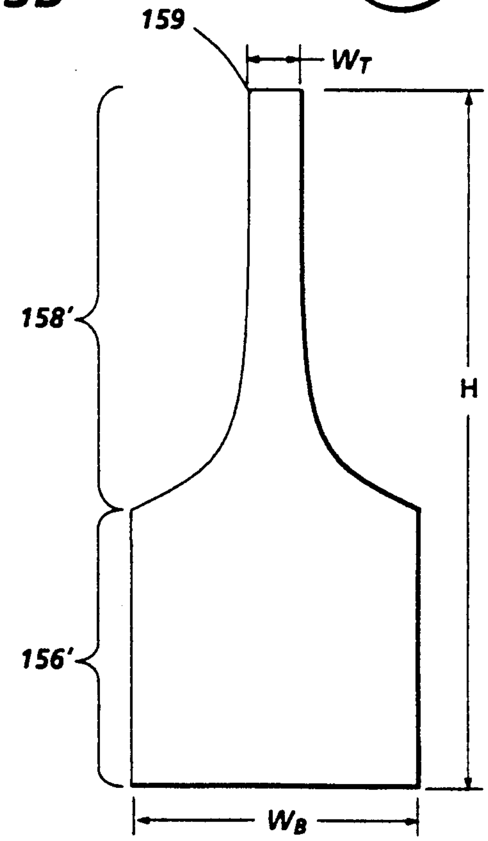

At least two shapes for the horn have been considered. With reference to FIG. 5A, in cross section, the horn may have a trapezoidal shape, with a generally rectangular base 156 and a generally triangular tip portion 158, with the base of the triangular tip portion having approximately the same size as the base. Alternatively, as shown in FIG. 5B, in cross section, the horn may have what is referred to as a stepped shape, with a generally rectangular base portion 156', and a stepped horn tip 158'. The trapezoidal horn appears to deliver a higher natural frequency of excitation, while the stepped horn produces a higher amplitude of vibration. The height H of the horn appears to have an effect on the frequency and amplitude response, with a shorter tip to base length delivering higher frequency and a marginally greater amplitude of vibration. Desirably the height H of the horn will fall in the range of approximately 1 to 1.5 inches (2.5 to 3.81 cm), with greater or lesser lengths not excluded. The ratio of the base width $W_B$ to tip width $W_T$ also effects the amplitude and frequency of the response with a higher ratio producing a higher frequency and a marginally greater amplitude of vibration. The ratio of $W_B$ to $W_T$ is desirably in the range of about 3:1 to about 6.5:1. The length L of the horn across belt 10 also effects the uniformity of vibration, with the longer horn producing a less uniform response. A desirable material for the horn is aluminum. Satisfactory piezoelectric materials, including lead zirconate-lead titanate composites, sold under the trademark PZT by Vernitron, Inc. (Bedford, Ohio), have high $D_{33}$ values. Displacement constants are typically in the range of 400–500 $m/_v \times 10^{-12}$. There may be other sources of vibrational energy, which clearly support the present invention, including but not limited to magnetostriction and electrodynamic systems.

In considering the structure of the horn 152 across its length L, several concerns must be addressed. It is highly desirable for the horn to produce a uniform response along its length, or non-uniform transfer characteristics may result. It is also highly desirable to have a unitary structure, for manufacturing and application requirements.

Figure 6A:
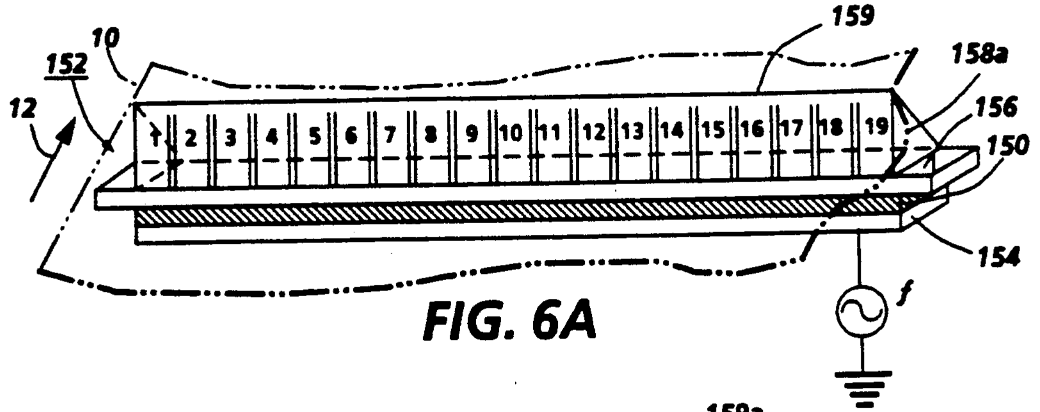
FIGS. 6A and 6B are, respectively, a view of a resonator and a graph of the response across the tip at a selected frequency.
Figure 6B:
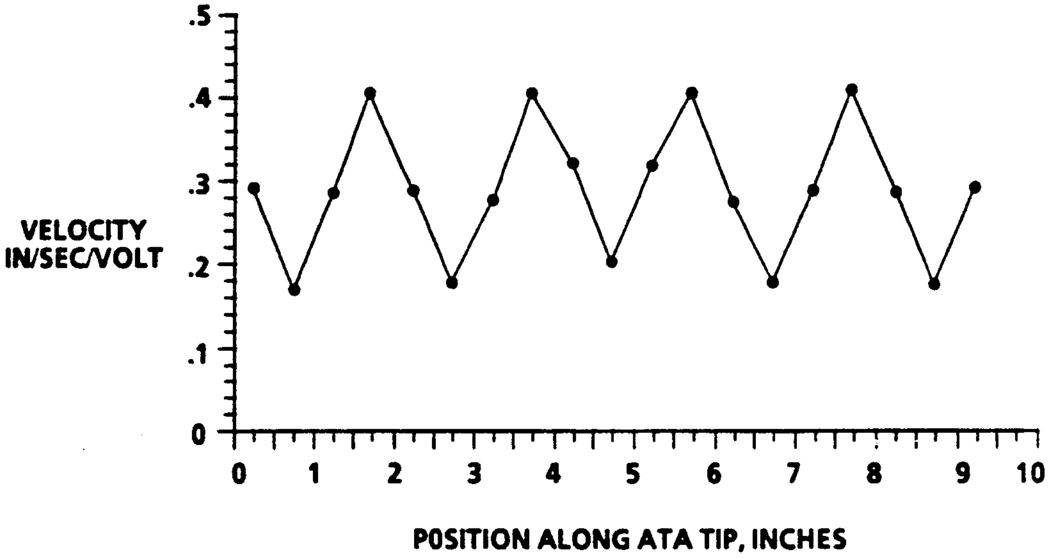

In FIG. 6A, a partial horn segmentation is shown in accordance with known resonators for welding arts, where the tip portion 158a of the horn 152 is cut perpendicularly to the plane of the imaging surface, and generally parallel to the direction of imaging surface travel, but not cut through the contacting tip 159 of the horn, while a continuous piezoelectric transducer 150, and a continuous backing plate 154 are maintained. Such an arrangement, which produces an array of horn segments 1–19, provides the response along the horn tip, as shown in FIG. 6B, which illustrates the velocity response along the array of horn segments 1–19 along the horn tip, varying from about 0.18 in/sec/v 0.41 in/sec/v (0.46 cm/sec/v to 1.04 cm/sec/v), when excited at a frequency of 61.1 kHz. The response tends toward uniformity across the contacting tip, but still demonstrates a variable natural frequency of vibration across the tip of the horn. It is noted that the velocity response is greater across the segmented horn tip, than across an unsegmented horn tip, a desirable result.

Figure 7A:
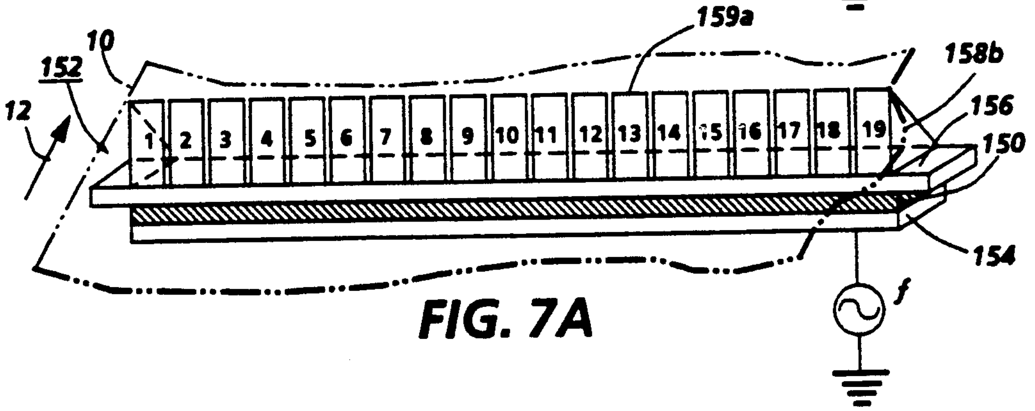
FIGS. 7A and 7B are, respectively, a view of another resonator and a graph of the resonator response across the tip at a selected frequency.
Figure 7B:
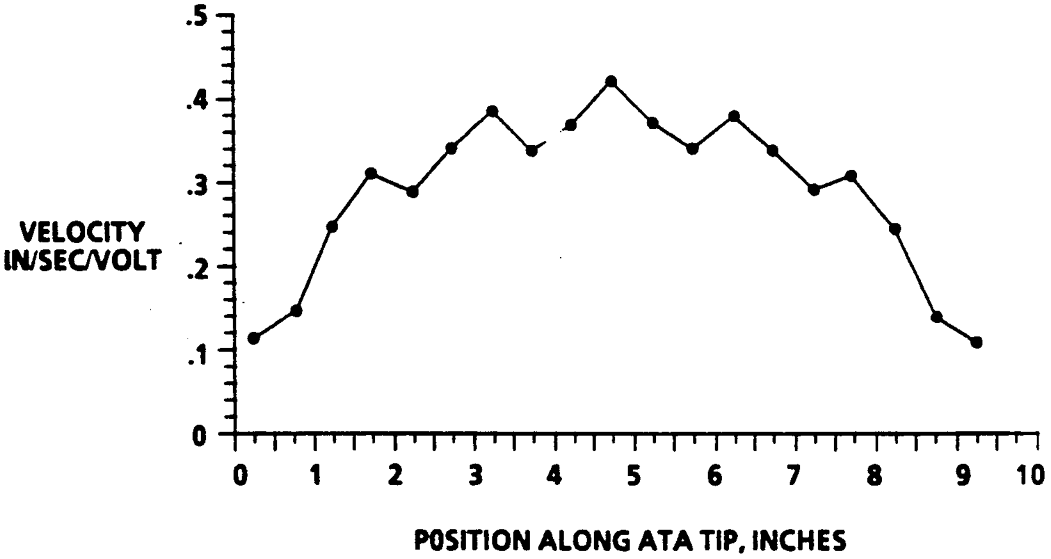

When horn 152 is fully segmented, each horn segment tends to act as an individual horn. In FIG. 7A a full horn segmentation is shown, where the horn 152 is cut perpendicular to the plane of the imaging surface, and generally parallel to the direction of imaging surface travel, and cut through contacting tip 159a of the horn and through tip portion 158b, but maintaining a continuous platform portion 156. When the horn is segmented through the tip, producing an open ended slot, each segment acts more or less individually in its response. As shown in FIG. 7B, which illustrates the velocity response along the array of horn segments 1–19 along the horn tip, the velocity response varies from about 0.11 in/sec/v to 0.41 in/sec/v (0.46 cm/sec/v to 1.04 cm/sec/v), when excited at a frequency of 61.1 kHz. It is noted that the velocity response is greater across the segmented horn tip, than across the unsegmented horn tip, a desirable result. The response tends to be more uniform across the tip, but some cross coupling is still observed. The overall curve shows a more uniform response, particularly between adjacent segments along the array of segments. It will be understood that the exact number of segments may vary from the 19 segments shown in examples and described herein. The length $L_S$ of any segment is selected in accordance with the height H of the horn with the ratio of H to $L_S$ falling in a range of greater than 1:1, and preferably about 3:1.

Figure 8A:
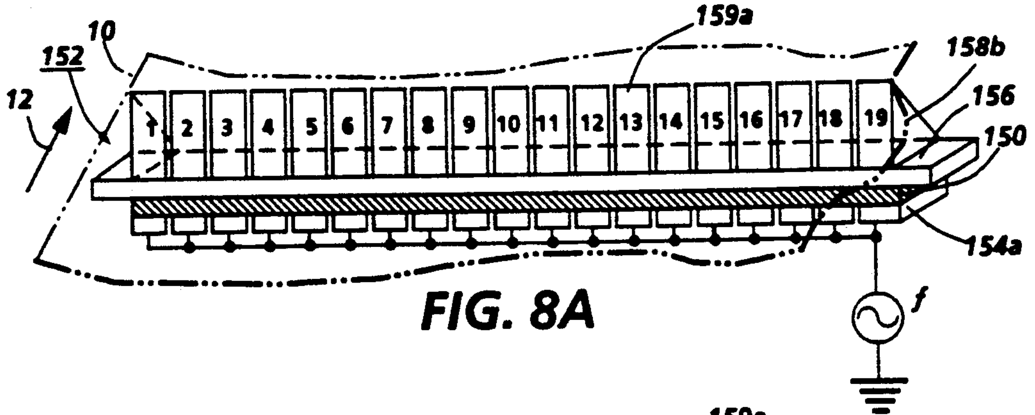
FIGS. 8A and 8B are, respectively, a view of still another resonator and a graph of the resonator response across the tip at a selected frequency.
Figure 8B:
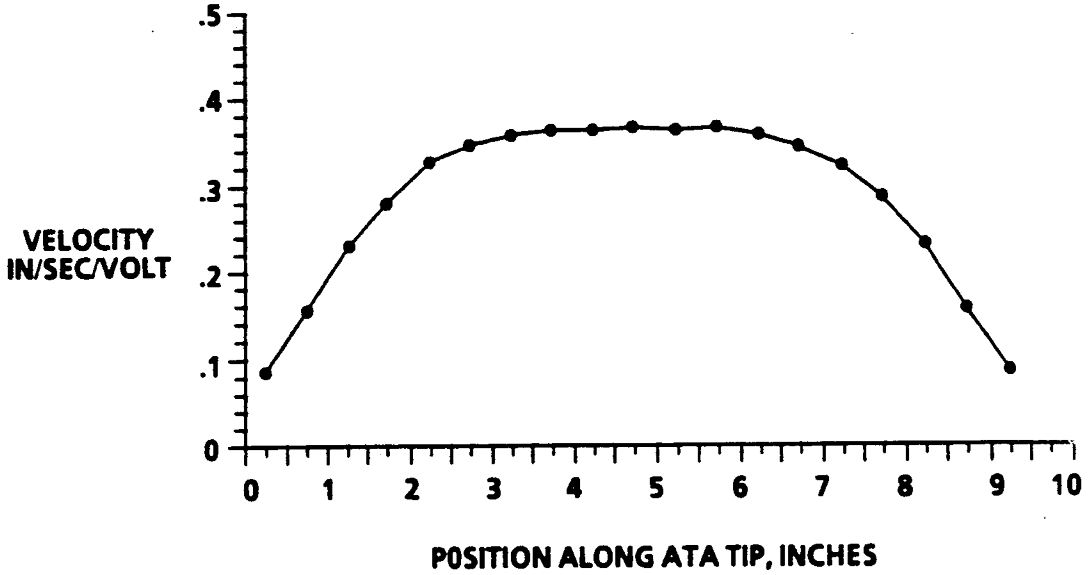

In FIG. 8A fully segmented horn 152 is shown, cut through contacting tip 159a of the horn and through tip portion 158b, with continuous platform 156 and piezoelectric element 150, with a segmented backing plate 154a. As shown in FIG. 8B, which illustrates the velocity response along the array of horn segments 1–19 along the horn tip, varying from about 0.09 in/sec/v to 0.38 in/sec/v (0.23 cm/sec/v to 0.38 in/sec/v), when excited at a frequency of 61.3 kHz tending to demonstrate a variable natural frequency of vibration across the tip of the horn. The overall curve shows good uniformity of response between adjacent segments along the array of horn segments.

In FIG. 9A, fully segmented horn 152 is shown, cut through the contacting tip 159a of the horn and through tip portion 158b, with continuous platform 156, a segmented piezoelectric element 150a and segmented backing plate 154a. As shown in FIG. 9B, overall a more uniform response is noted, although segment to segment response is less uniform than the case where the backing plate was not segmented. Each segment acts completely individually in its response. A high degree of uniformity between adjacent segments is noted.

While all the above resonator structures show backplates, the principle of segmentation limiting cross coupling would apply to a structure without a backplate.

In accordance with the invention and with reference again to FIG. 2, A. C. power supply 102 drives piezoelectric transducer 150 at a frequency f selected based on the natural excitation frequency of the horn 160. If the horn is transversely segmented, as proposed in FIGS. 6A–9A the segments operate as a plurality of horns, each with an individual response rather than a common uniform response. Horn tip velocity is desirably maximized for optimum toner release, but as the excitation frequency varies from the natural excitation frequency of the device, the tip velocity response drops off sharply. FIG. 10A shows the effects of the nonconformity, and illustrates tip velocity in mm/sec. versus position along a sample segmented horn, when a sample horn was excited at a single frequency of 59.0 kHz. The example shows that tip velocity varies at the excitation frequency from less than 100 mm/sec. to more than 1000 mm/sec. along the sample horn. Accordingly, FIG. 10B shows the results where A.C. power supply 102 drives piezoelectric transducer 150 at a range of frequencies selected based on the expected natural excitation frequencies of the horn segments. The piezoelectric transducer was excited with a swept sine wave signal over a range of frequencies 3 kHz wide, from 58 KHz to 61 KHz, centered about the average natural frequency of all the horn segments. FIG. 10B shows improved uniformity of the response with the response varying only slightly less than 200 mm/sec. to about 600 mm/sec.

The desired period of the frequency sweep, i.e., sweeps/sec. is based on photoreceptor speed, and selected so that each point along the photoreceptor sees the maximum tip velocity, and experiences a vibration large enough to assist toner transfer. At least three methods of frequency band excitation are available: a frequency band limited random excitation that will continuously excite in a random fashion all the frequencies within the frequency band; a simultaneous excitation of all the discrete resonances of the individual horns with a given band; and a swept sine excitation method where a single sine wave excitation is swept over a fixed frequency band. Of course, many other wave forms besides sinusoidal may be applied. By these methods, a single, or identical dilation mode is obtained for all the horns.

It will also be noted from FIGS. 10A and 10B, as well as other resonator response curves 6B–9B that there is a tendency for the response of the segmented horn segment to fall off at the edges of the horn, as a result of the continuous mechanical behavior of the device. However, uniform response along the entire device, arranged across the width of the imaging surface, is required. To compensate for the edge roll off effect, the piezoelectric transducer elements of the resonator may be segmented into a series of devices, each associated with at least one of the horn segments, with a separate driving signal to at least the edge elements. As shown in FIG. 11A, the resonator of FIG. 9A may be provided with an alternate driving arrangement to compensate for the edge roll off effect, with the piezoelectric transducer element of the resonator segmented into a series of devices, each associated with at least one of the horn segments, with a separate driving signal to at least the edge elements. As shown in FIG. 11B, in one possible embodiment of the arrangement, wherein a series of 19 corresponding piezoelectric transducer elements and horns are used for measurement purposes, Curve A shows the response of the device where 1.0 volts is applied to each piezoelectric transducer element 1 through 19. Curve B shows a curve where 1.0 volts is applied to piezoelectric transducer elements 3–17, 1.5 volts is applied to piezoelectric transducer elements 2 and 18 and 3.0 volts is applied to piezoelectric transducer elements 1 and 19, as illustrated in FIG. 11A. As a result, curve B is significantly flattened with respect to curve A, for a more uniform response. Each of the signals applied is in phase, and in the described arrangement is symmetric to achieve a symmetric response across the resonator. Of course, instead of providing a piezoelectric element for each horn segment, separate piezoelectric elements for the outermost horn segments might be provided, with a continuous element through the central region of the resonator, to the same effect.

With reference again to FIG. 1, it will no doubt be appreciated that the inventive resonator and vacuum coupling arrangement has equal application in the cleaning station of an electrophotographic device with little variation. Accordingly, as shown in FIG. 1, resonator and vacuum coupling arrangement 200 may be arranged in close relationship to the cleaning station F, for the mechanical release of toner from the surface prior to cleaning. Additionally, improvement in pre-clean treatment is believed to occur with application of vibratory energy simultaneously with pre-clean charge leveling. The invention finds equal application in this application.

As a means for improving uniformity of application of vibratory energy to a flexible member for the release of toner therefrom, the described resonator may find numerous used in electrophotographic applications. One example of a use may be in causing release of toner from a toner bearing donor belt, arranged in development position with respect to a latent image. Enhanced development may be noted, with mechanical release of toner from the donor belt surface and electrostatic attraction of the toner to the image.

The invention has been described with reference to a preferred embodiment. Obviously modifications will occur to others upon reading and understanding the specification taken together with the drawings. This embodiment is but one example, and various alternatives, modifications, variations or improvements may be made by those skilled in the art from this teaching which are intended to be encompassed by the following claims.

We claim:

1. In an imaging device having a non-rigid member with a charge retentive surface moving along an endless path, means for creating a latent image on the charge retentive surface, means for imagewise developing the latent image with toner, means for electrostatically transferring the developed toner image to a copy sheet, and a resonator for enhancing toner release from the charge retentive surface, producing relatively high frequency vibratory energy and having a portion thereof adapted for contact across the flexible belt member, generally transverse to the direction of movement thereof, the resonator comprising:

a horn member for applying the high frequency vibratory energy to the non-rigid member, having a platform portion, a horn portion, and a contacting portion said horn member divided into a linear array of horn segments across said belt member, each horn segment including horn portion and contacting portion;

vibratory energy producing means coupled to said horn platform for generating the high frequency vibratory energy required to drive said horn member; and a voltage source for driving said vibratory energy producing means through a range of frequency responses, said range of frequency responses including resonant frequencies of each horn segment.

2. The device as defined in claim 1 wherein the voltage source for driving said vibratory energy producing means through a range of frequency responses is an A.C. voltage source.

3. The device as defined in claim 1 wherein the energy producing vibratory elements are piezoelectric transducer element.

4. The device as defined in claim 1 wherein all of the frequencies through the range are applied to the vibratory energy producing means on a random basis.

5. The device as defined in claim 1 wherein the range of frequencies is applied simultaneously to the vibratory energy producing means.

6. The device as defined in claim 1 wherein the range of frequencies is applied in a continuous sweep to the vibratory energy producing means.

7. The device as defined in claim 1 wherein the range of frequencies is about 3 kHz wide.

8. In an imaging device having a non-rigid member with a charge retentive surface moving along an endless path, means for creating a latent image on the charge retentive surface, means for imagewise developing the latent image with toner, means for electrostatically transferring the developed toner image to a copy sheet, and a resonator mechanically coupled to said non-rigid member adjacent said transfer means for enhancing toner released from the charge retentive surface, producing relatively high frequency vibratory energy and having a portion thereof adapted for contact across the flexible belt member, generally transverse to the direction of movement thereof, the resonator comprising:

a horn member for applying high frequency vibratory energy to the non-rigid member, having a platform portion, a horn portion, and a contacting portion;

said horn member divided into a linear array of horn segments across said belt member, each horn segment including horn portion and contacting portion;

vibratory energy producing means coupled to said horn platform for generating the high frequency vibratory energy required to drive said horn member; and a voltage source for driving said vibratory energy producing means through a range of frequency responses, said range of frequency responses including resonant frequencies of each horn segment.

9. The device as defined in claim 8 wherein the voltage source for driving said vibratory energy producing means through a range of frequency responses is an A.C. voltage source.

10. The device as defined in claim 8 wherein the energy producing vibratory elements are piezoelectric transducer elements.

11. The device as defined in claim 8 wherein all of the frequencies through the range are applied to the vibratory energy producing means on a random basis.

12. The device as defined in claim 8 wherein the range of frequencies is applied simultaneously to the vibratory energy producing means.

13. The device as defined in claim 8 wherein the range of frequencies is applied in a continuous sweep to the vibratory energy producing means.

14. The device as defined in claim 8 wherein the range of frequencies is about 3 KHz wide.

* * * * *